United States Patent [19]

Galley

[11] 4,084,458
[45] Apr. 18, 1978

[54] MANUFACTURE OF CONTACT LENSES

[75] Inventor: Geoffrey Harrison Galley, Radlett, England

[73] Assignee: Global Vision (U.K.) Limited, Southampton, United Kingdom

[21] Appl. No.: 610,244

[22] Filed: Sep. 29, 1975

Related U.S. Application Data

[63] Continuation-in-part of Ser. No. 511,091, Oct. 1, 1974, abandoned.

[30] Foreign Application Priority Data

Oct. 6, 1973 United Kingdom .............. 46775/73

[51] Int. Cl.² ........................... B23B 1/00; B23B 5/40
[52] U.S. Cl. ......................................... 82/1 C; 82/11; 82/12; 51/101 LG; 51/105 LG
[58] Field of Search ............................. 82/1 C, 11, 12; 51/101 LG, 105 LG; 351/160

[56] References Cited

U.S. PATENT DOCUMENTS

| 3,064,531 | 11/1962 | Bullock | 82/11 X |
|---|---|---|---|
| 3,301,105 | 1/1967 | Morris | 82/14 R |
| 3,423,886 | 1/1969 | Schpak et al. | 82/12 X |
| 3,630,111 | 12/1971 | Hartford et al. | 82/1 C |
| 3,738,204 | 6/1973 | Spriggs | 82/1 C |
| 3,763,597 | 10/1973 | Schlotfeldt | 82/12 X |

FOREIGN PATENT DOCUMENTS

| 1,343,301 | 1/1974 | United Kingdom | 82/11 |
|---|---|---|---|
| 1,156,455 | 6/1969 | United Kingdom | 82/11 |
| 927,326 | 5/1963 | United Kingdom | 82/11 |

Primary Examiner—Leonidas Vlachos
Attorney, Agent, or Firm—Thomas R. Boland

[57] ABSTRACT

A method of manufacturing a contact lens by machining a lens blank in a suitable machinable condition. The concave lens surface is machined first and the circumferential edge surface is then machined with the blank mounted in the same position. The partly formed blank is repositioned and the convex lens surface machined.

12 Claims, 11 Drawing Figures

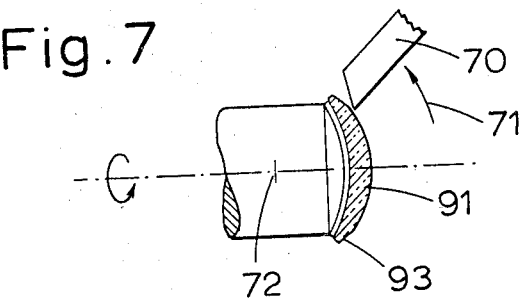
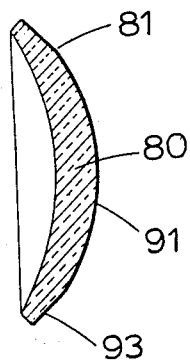
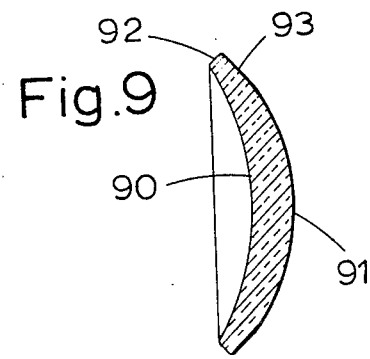
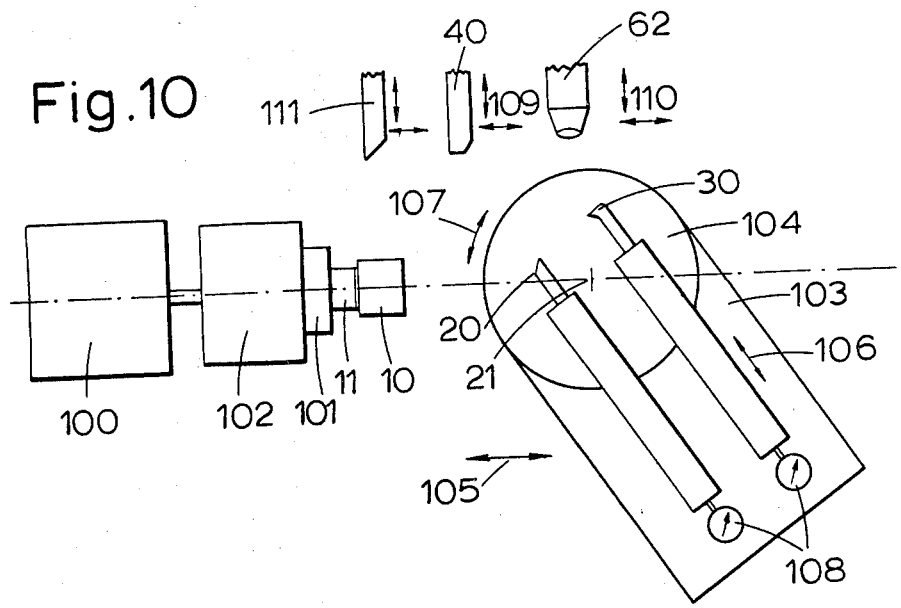

MANUFACTURE OF CONTACT LENSES

This application is a continuation-in-part of application Ser. No. 511,091, filed Oct. 1, 1974 and now abandoned.

This invention relates to the manufacture of contact lenses.

Contact lenses are currently produced by a machining process from lens blanks formed of the appropriate plastics material. In one current machining process, a lens lathe is employed to machine a first curved lens surface on the blank, the blank is removed and repositioned and the second lens surface is machined. The circumferential edge surface is formed by the intersection of the first and second curved surfaces, or by shearing through the peripheral portion of the partly formed lens. The resulting circumferential edge surface then generally has to be polished to the desired profile and dimensions. Alternatively, a yet further machining operation is performed on the partly formed lens in a lens-edging machine, to machine the desired circumferential edge surface. This involves a further re-positioning step in a machine.

One object of the present invention is to provide a method of manufacturing a contact lens in which a circumferential edge lens surface of desired profile, dimension, and accuracy may more readily be achieved and reproduced.

According to the present invention in one aspect there is provided a method of manufacturing a contact lens from a lens blank, comprising machining the surface which will form the circumferential edge surface of the finished lens, before machining at least one of the two mutually opposed curved lens surfaces.

In another aspect there is provided a contact lens having its convex lens surface machined from a suitable blank subsequent to machining of its concave lens surface and subsequent to machining of its circumferential edge surface.

In a further aspect of the invention there is provided a machine for manufacturing a contact lens comprising a rotatable lens blank support, a first material removal tool arranged to traverse said support in an arc about an axis to form a first curved lens surface on a blank held by said support, and a second material removal tool arranged to traverse said support to form a circumferential edge surface on such blank, said support and said tools being arranged so that both said tool traversals may be effected without removing such blank from said support.

Embodiments of the invention will now be described by way of example, with reference to the accompanying drawings in which:

FIGS. 1, 2, 3, 4, 5, 6, 7, 8 and 9 show schematically inside elevation consecutive steps in the manufacture of a contact lens according to the invention, the curvature of the lens being rather exaggerated to assist explanation;

FIG. 10 is a schematic plan view of a machine according to the invention for machining contact lenses.

Figure 1:
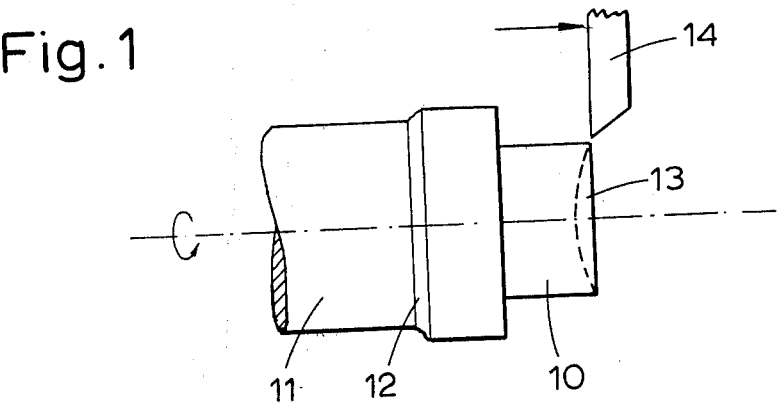

Referring to the drawings, FIG. 1 shows a lens blank 10 of the appropriate plastic material in a machinable condition. The blank 10 is mounted to a rotatable support 11, suitably by means of a thermo-plastic adhesive 12. The support 11 is adapted for reception in a chuck or the like of a material removal machine such as a lens lathe. A particular preferred machine for carrying out the invention will be described below with reference to FIG. 10. The blank 10 is preferably in the form of a right circular cylinder with a pre-moulded dished end 13.

It will be understood that the contact lenses in their finished form, as shown in FIG. 9, present a concave lens surface 90 intended in use to sit peripherally against the eye ball, an opposite convex lens surface 91 of appropriate curvature to ameliorate the vision defect of the user and a circumferential edge surface 92 of tangible thickness. A frusto-conical surface 93 is also preferably provided and all the boundaries between the surfaces 90, 91, 92 and 93 are polished to a smooth condition.

Referring back to FIG. 1 a first step is preferably to reduce the blank 10, or at least a portion of the length thereof, to a desired diameter, e.g. 7 mm. This step also serves accurately to centre the rotating blank. The machining may be effected by axial traversal of a cutting tool 14, while the supported blank 10 is rotated about its longitudinal axis by the machine.

Figure 2:
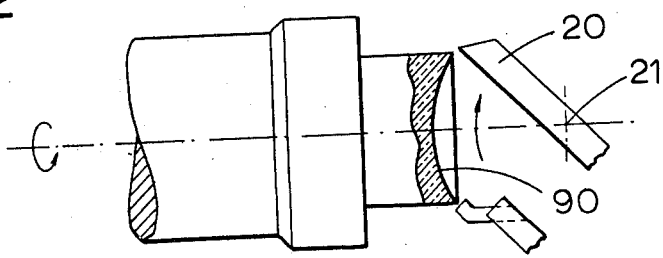

Referring to FIG. 2 the first concave lens surface 90 is machined by traversal of a radius cutting tool 20 in an arc about an axis 21.

Figure 3:
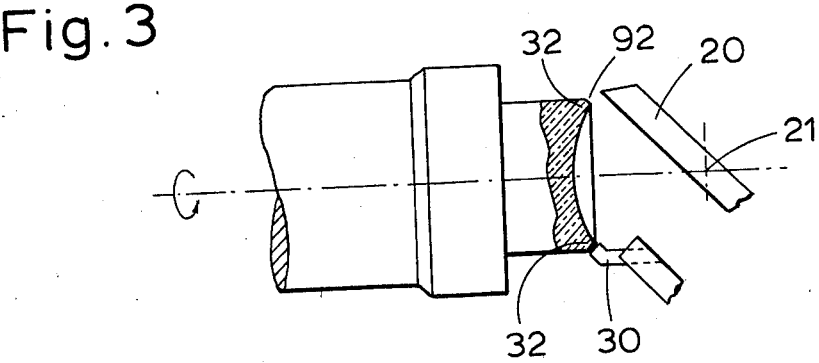

Referring to FIG. 3 an edge forming tool 30 machines the desired circumferential edge surface 92 on the rotating supported blank 10. The tool 30 is conveniently fed forwards into material moving engagement with the blank immediately after the tool 20 has finished each traverse in its machining surface 90 as shown in FIG. 3. The tool 30 is conveniently mounted on a radius arm together with tool 20 to pivot about the same axis 21. The lens blank material may be somewhat brittle and for best results care is taken to traverse the tool 30 at controlled speed.

One defect of the currently used process is that it is difficult to machine an accurate edge surface after machining both the curved lens surfaces. In the method according to the present invention it will be appreciated that the circumferential edge surface 92 is machined while still bodily supported by the bulk 32 of the blank material behind the edge surface 92. That material 32 is then subsequently machined away to provide the convex surface 91 as will be described below. In addition, it will be appreciated that both the concave surface 90 and the edge surface 92 are machined without removing and repositioning the blank in the machine. That leads to enhanced accuracy in profile and dimensions of the edge surface 92, to enhanced accuracy in positioning of surface 92 relative to surfaces 90 and 91, and to enhanced ease in achievement and reproduceability of a desired surface 92.

It is possible in an alternative embodiment to machine the convex surface 91 and the edge surface 92 while the blank is in its first supported position and then subsequently to machine the concave surface 90: however the particularly described and illustrated method is preferred at the present time.

Figure 4:
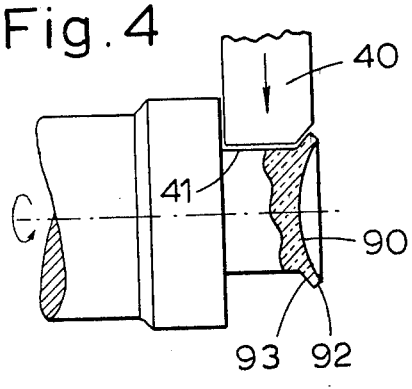

Referring to FIG. 4, a further tool 40 is then moved radially in to work on the rotating partly formed lens to machine a frusto-conical surface 93 and simultaneously to machine a right circular cylindrical surface 41. As with the edging step shown in FIG. 3 the best results are achieved by taking care to feed tool 40 at a controlled speed in view of the thinness of the tangible edge of the lens.

Figure 5:
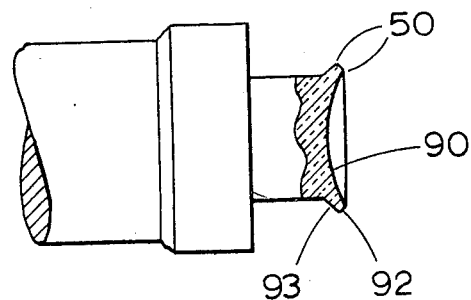

As shown in FIG. 5, the circumferential boundaries 50 between the concave surface 90 and the edge surface 92, and between the edge surface 92 and the frusto-conical surface 93 are then polished to round them slightly.

Figure 6:
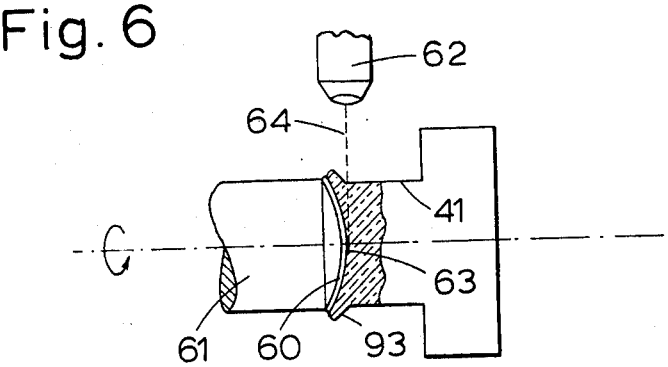

Referring to FIG. 6, the polished partly-worked blank from FIG. 5 is moved from its support 11 and re-positioned the other way round with machined concave surface 90 stuck e.g. with thermoplastic adhesive 60 to a second support 61. A microscope 62 is then used to view the crown 63 of the concavity through the body of the material (which is of course transparent) perpendicular to the lens axis, as shown by vision line 64. The microscope is mounted to the machine and thus its position can be accurately determined by a dial gauge or the like when the crown 63 is centered in the cross-wires of the microscope. This use of a microscope 62 eliminates the necessity for physical measurements on the lens at this stage.

Referring to FIG. 7, a further tool 70 is then set in accordance with the indication of the position of the microscope 62, and traversed as shown by arrows 71 about axis 72 to machine the convex lens surface 91.

The machined lens 80 is then removed from the support 61 and boundaries 81 between the surface 91 and frusto-conical surface 93 are polished, to result in the finished machined lens 90 shown in FIG. 9.

The tools referred to are preferably diamond cutters but tungsten carbide or steel tools may sometimes be used instead.

Figure 4A:
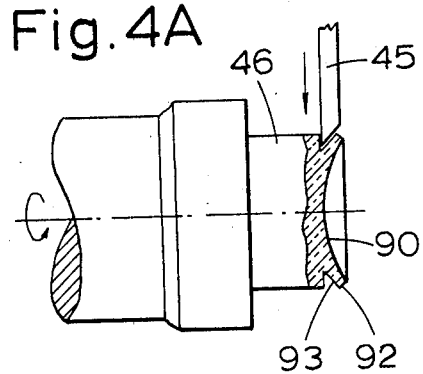
FIG. 4A shows a modification of the step of FIG. 4.

FIG. 4A shows a modification in which a tool 45 is substituted for tool 40. As shown this forms only the frusto-conical surface 93. The microscope 62 can then be positioned to view the crown 63 through the original substantially cylindrical blank surface 46 if desired.

Referring to FIG. 10 there is shown very schematically a machine for making contact lenses according to the invention. The machine bed is basically that of a lens lathe and comprises a motor 100 for rotating a chuck 101 on a head stock 102. The chuck 101 is shown gripping the support 11 of FIGS. 1 to 5. Tools 20 and 30 are shown mounted on a table 103 on a radius arm 104 for movement as described about axis 21. The tools are adjustable as shown by arrows 105, 106 and 107, and gauges 108 indicate their longitudinal positions. Tool 40 and microscope 62 are movable as shown by arrows 109 and 110. An adjustable tool 111 serves to reduce the original blank 10 to a desired diameter as a first step as described. The surface 93 may be machined slightly rounded by appropriate shaped tools 40 and 45.

The method of manufacturing contact lenses (as well as the machine described herein), is applicable to all types of contact lenses, including both 'hard' contact lenses and 'soft' contact lenses. The manufacture of all types of contact lenses will benefit from the enhanced accuracy of the method of the present invention and the greater facility whereby such accuracy is achieved. Inasmuch as 'soft' contact lenses are machined according to the method of the present invention in their non-hydrated relatively hard state and subsequently swollen in an aqueous medium to their soft, operative condition, the ability to attain great precision is highly desirable since any imperfections in the non-hydrated state are magnified when the lens is swollen.

I claim:

1. In a method of manufacturing a contact lens having a first and second lens surfaces, said method including the steps of:
   a. centering a contact lens blank on the chuck of a lens lathe having at least a radius cutting tool and edge cutting tools means,
   b. machining the centered blank with said radius cutting tool to form the first curved lens surface, and
   c. machining the second opposite curved lens surface, the improvement comprising machining a peripheral edge portion with the edge tool cutting means while the blank is still centered on the chuck, after performing step (b), so as to form a circumferential edge surface adjacent said first curved surface and to separately form a frusto-conical surface adjoining said circumferential edge surface and opposite the peripheral portion of said first curved surface.

2. A method according to claim 1 wherein the second curved lens surface is cut by removing the partly worked blank after machining the peripheral edge portion, remounting it in the lathe or in another lathe and machining the second curved lens surface so that the second curved lens surface leads into the frusto-conical surface.

3. A method of manufacturing a contact lens comprising the steps of:
   a. providing a contact lens blank,
   b. rotatably mounting said blank in a material removal machine provided with at least a first material removal tool adapted to move in an arc and a second material removal tool means,
   c. machining said mounted blank with said first tool to form a first curved lens surface,
   d. machining a peripheral portion of said mounted blank with said second tool to form a circumferential edge surface,
   e. machining a frusto-conical surface on said blank opposite and concentric with said first curved lens surface and adjacent said edge surface, and
   f. machining a second opposite curved lens surface adjoining said frusto-conical surface.

4. A method according to claim 3, wherein said blank is rotatably mounted in a first position in said machine while said first curved surface and said peripheral edge portion are machined.

5. A method according to claim 4, wherein said blank is maintained in said first position in said machine while said frusto-conical surface is machined, and thereafter the partly worked blank is removed from said first position and then rotably mounted in a second position in the machine, said second surface being machined while the partly worked blank is in said second position.

6. A method according to claim 3 wherein the first curved lens surface is the concave surface of the lens and the frusto-conical surface is an external frusto-conical surface.

7. A method according to claim 6 including viewing the crown of the machined first, concave lens surface through the body of the partly worked blank in a direction perpendicular to the lens axis to determine the position of said crown relative to a further working tool, setting said further tool in accordance with said determined position, and then machining said second, convex lens surface by means of said further tool to provide a lens of predetermined thickness dimension.

8. A method according to claim 3 wherein the second material removal tool means comprises an edge cutting tool adapted to form said circumferential edge surface and a further cutting tool adapted to form said frusto-conical surface.

9. A method according to claim 8 wherein said first tool and said edge cutting tool move in arcs about a common axis to effect their respective machining operations, said edge cutting tool engaging the blank subsequent to a traverse of said first tool.

10. A method of manufacturing a contact lens comprising:
   a. providing a contact lens blank,
   b. rotatably mounting said blank in a material removal machine,
   c. machining said mounted blank to form a first curved lens surface,
   d. machining a peripheral portion of said mounted blank to form a circumferential edge surface,
   e. machining a frusto-conical surface on said blank opposite said first curved lens surface and adjacent said edge surface, and
   f. removing said blank after machining said circumferential edge surface and said frusto-conical surface, remounting said blank in the same or another material removing machine, and machining a second opposite curved lens surface adjoining said frusto-conical surface.

11. A machine for manufacturing a contact lens from a contact lens blank said machine comprising:
   i. a lens blank support rotatable about an axis;
   ii. first and second material removing tools mounted on a table on a radius arm, said radius arm being traversable in an arc about an axis and adapted to permit said first tool to contact said lens blank and machine a curved lens surface thereon, and to permit said second tool to thereafter contact said blank and machine a circumferential edge surface thereon without removing the blank from the support, and
   iii. a third material removing tool adapted to advance transversely of the axis of rotation of the blank support and to form a frusto-conical surface on the blank at its periphery.

12. A machine according to claim 11, including a viewing device arranged to view and determine the position of the crown of a machined concave lens surface on such blank through the body of the blank in a direction perpendicular to the lens axis, a gauge to indicate such determined position, and a further material removal tool settable in accordance with said determined position for traversal of said support to machine a convex lens surface.

* * * * *